United States Patent [19]

Spano

[11] Patent Number: 5,643,661
[45] Date of Patent: Jul. 1, 1997

[54] PASSIVE FIRE PROTECTION

[75] Inventor: Vincent William Spano, Rugeley, Great Britain

[73] Assignee: AIC ISO Covers Limited, Staffordshire, United Kingdom

[21] Appl. No.: 507,263

[22] PCT Filed: Feb. 15, 1994

[86] PCT No.: PCT/GB94/00304

§ 371 Date: Aug. 21, 1995

§ 102(e) Date: Aug. 21, 1995

[87] PCT Pub. No.: WO94/19424

PCT Pub. Date: Sep. 1, 1994

[30] Foreign Application Priority Data

Feb. 25, 1993 [GB] United Kingdom ............... 9303763

[51] Int. Cl.⁶ ............................................. D04H 1/08
[52] U.S. Cl. .................. 442/325; 428/68; 428/921; 106/18.11; 442/326
[58] Field of Search ............................. 428/921, 280, 428/281, 282, 68; 106/18.11

[56] References Cited

U.S. PATENT DOCUMENTS

| 4,189,619 | 2/1980 | Pedlow | 174/48 |
| 4,273,879 | 6/1981 | Langer et al. | 521/91 |

FOREIGN PATENT DOCUMENTS

| 2390399 | 12/1978 | France . |
| 3724744 | 2/1989 | Germany . |
| 1604072 | 12/1981 | United Kingdom . |

*Primary Examiner*—Christopher Raimund
*Attorney, Agent, or Firm*—Learman & McCulloch

[57] ABSTRACT

A passive fire protection sheet material is disclosed. The sheet material comprises at least one layer of a rubber compound containing a frit composition which when exposed to heat or flame will char and fuse the ceramic to form a layer within the char together with one or more layers of ceramic fiber material.

10 Claims, 2 Drawing Sheets

PASSIVE FIRE PROTECTION

This invention relates to passive fire protection covers or enclosures particularly but not exclusively for use in the oil and gas industry.

BACKGROUND OF THE INVENTION

In the event of fire it is important to be able to shut off the flow of oil or gas for example from a well and the object of the passive protection is to minimise heat rise in a control valve and its actuator to enable this to be done. Erosive flames resulting for example from ruptured pipe work in which oil or gas is flowing at pressure, are particularly difficult to protect against with conventional materials.

However as will be appreciated the invention may find uses in other applications and other industries.

SUMMARY OF THE INVENTION

According to the invention, a passive fire protection sheer material comprises at least one layer of insulant and at least one layer which includes a cross-linked rubber compound containing a frit based composition.

The rubber material preferably has fire resistant properties. Suitable frit is disclosed for example in U.K. Patents numbered 2188643, 2120208, 2213813, 2232986 and 2234754. Under fire conditions the rubber burns to produce a char which contains the frit, and the frit fuses to form a protective layer. The rubber may be on the outside of an enclosure, and if so provides erosion protection to the insulant located inside it, enabling the latter to contribute to the fire protection without being physically destroyed. However the rubber may be on the inside and/or there may be alternate layers of both.

The insulant may be ceramic fibres which by their nature are heat resistant and trap air. But other materials are possible for example clay particles or beads trapped in a blanket, quilt or duvet, or calcium silicate as another example.

THE DRAWINGS

One presently preferred embodiment of the invention is now more particularly described with reference to the accompanying drawings in which.

DETAILED DESCRIPTION

Figure 1:
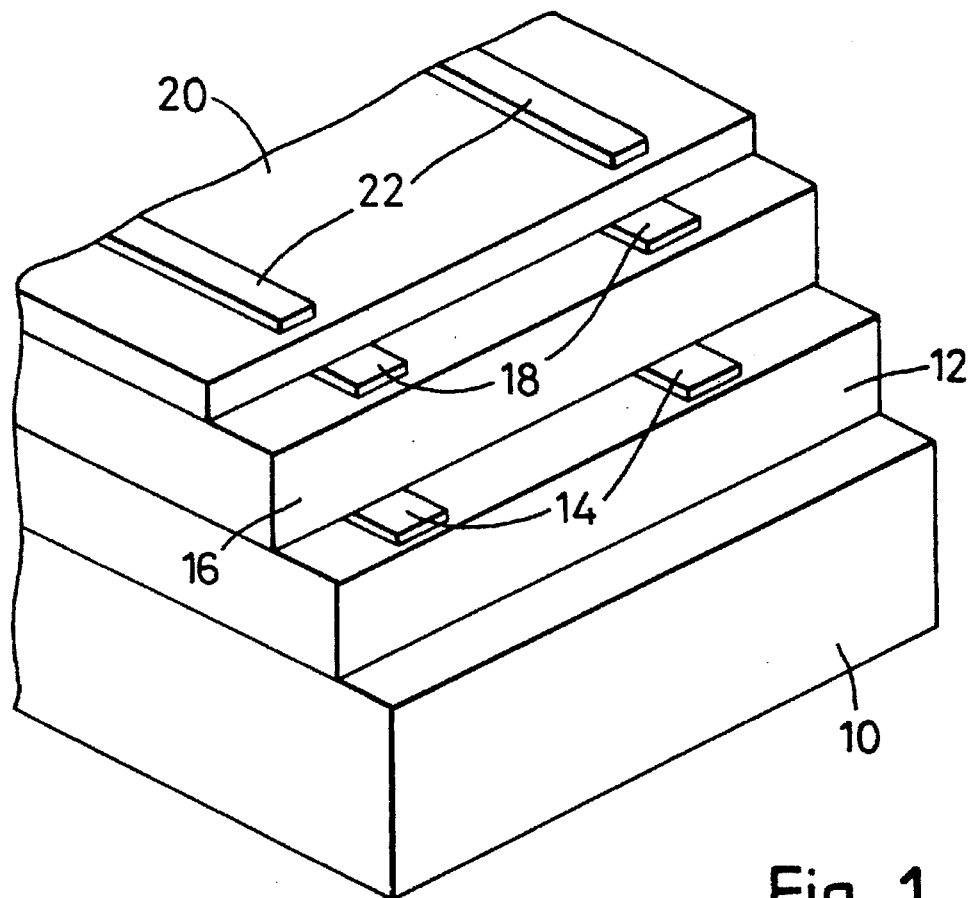
FIG. 1 is a diagrammatic sectional perspective view of a passes fire protection in place.

Turning now to FIG. 1, the reference 10 indicates a steel substrate representing an article which is to be fire protected. It will be understood that this may be a valve or any other article of any shape, often quite complex shape: the drawing shows a simple parallelopiped shape. The reference 12 indicates a first layer of the ceramic fibre material as more particularly described hereunder. This layer 12 is held in position for example by steel straps 14. A second layer 16 is or may be the same as layer 12 and is likewise held in position by further straps 18. An outer layer 20 of the rubber/frit material is also held in place by steel straps 22 and there may be a further protective enclosure not shown.

Figure 2:
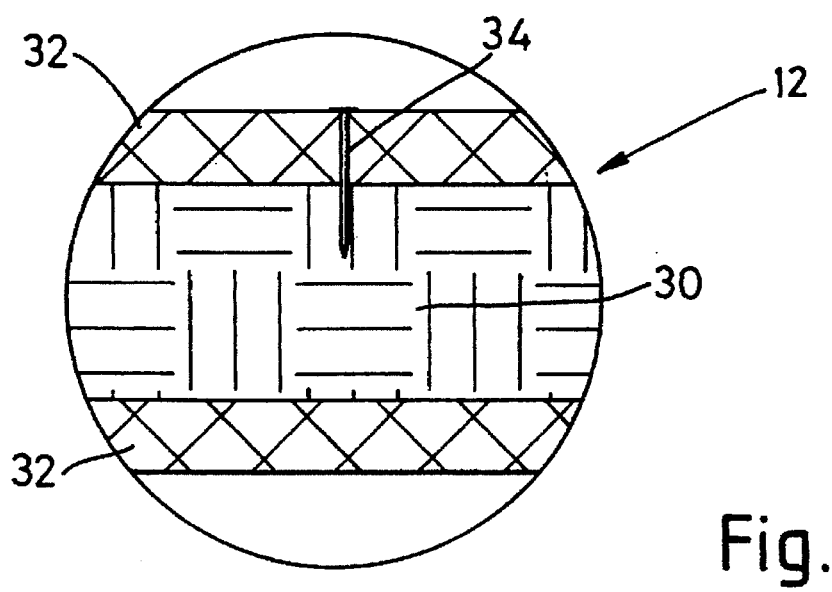
FIG. 2 is an enlarged and more detailed sectional view of one of the layers of ceramic fibres.

Turning now to FIG. 2, the ceramic fibre material forming the layers 12, 16 may be loosely or otherwise felted into a sheet material 30 and enclosed in a duvet 32 of a cloth, which may be a felted or woven textile material, or a cloth made by impregnating glass fibre sheet material with a suitable resin mix. The object is to disperse the fibres uniformly through the material 12, 16, and maintain it in position. The ceramic fibre may be held in position within the duvet by the use of ceramic or metallic firing pins 34. This may help to prevent the ceramic fibre from creeping away from duvet edges.

However, it is to be understood that FIG. 2 is particularly diagrammatic and does not necessarily represent the thickness of the sheet as it is in practice. A sheet may be used for example in the order of 12.5, 25, 38 or 50 mm thickness and any combination of layers of this or these thicknesses. The rubber/frit layer or layers may be of the order of 5 mm thick.

Figure 3:
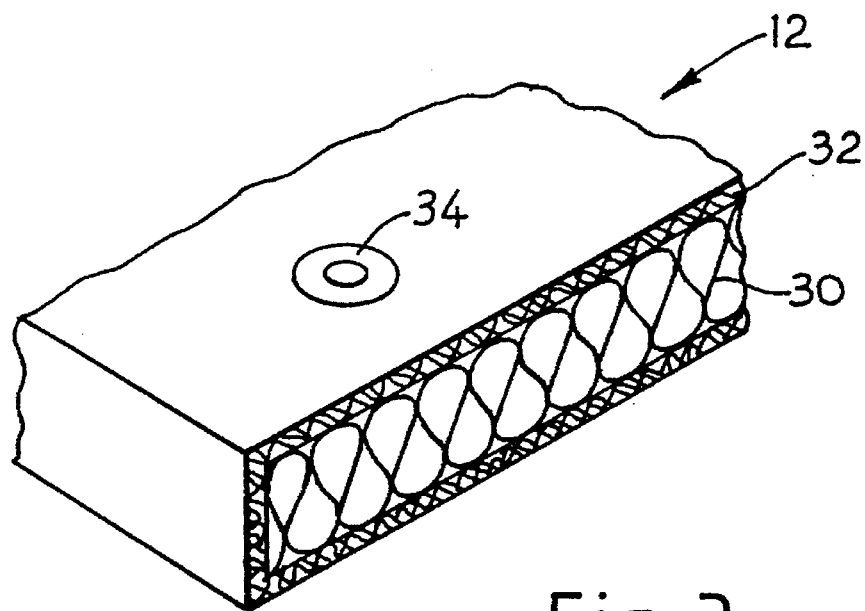
FIG. 3 is a view similar to FIG. 2 but showing an alternative.

FIG. 3 shows an alternative construction for the layer(s) 12, 16, in which the fibres are a long-fibre ceramic wool felted into a sheet which may be folded into a sinuous shape 30, and enclosed in a jacket 32 of silicon coated glass cloth. The glass cloth may be felted or woven, and may be impregnated with a suitable resin mix.

Whatever construction is used for the ceramic fibres, the object is to trap massive volumes of air.

Figure 4:
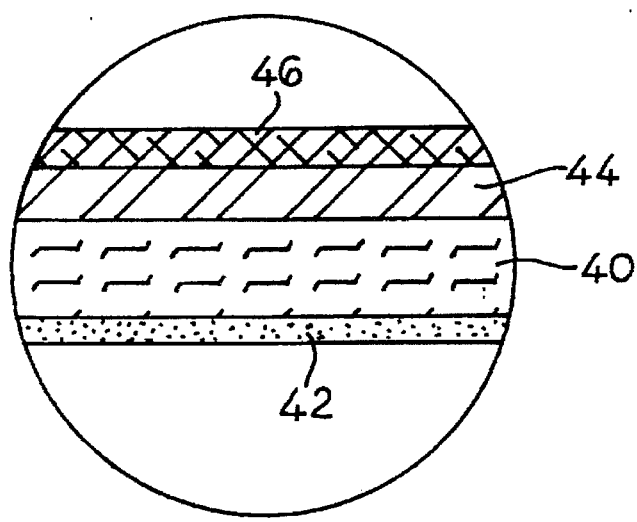
FIG. 4 is a fragmentary sectional view of another layer of the material used in FIG. 1.

More particularly, the layer 20, see FIG. 4, is made of a fire resistant PVC/rubber compound 40 with the dispersed ceramic frit particles therein. This material may be the one sold by Brunner Mond & Company under the trade mark CEEPREE. The rubber could be neoprene, chloroprene, EPDM or a copolymer of a polyolefin including ethylene. Preferred values are 40–60% rubber, 20–30% Ceepree frit, and balance filler which may be ceramic or fibre, e.g. Mullite, or $Al_2O_3$.

This rubber/frit layer is enclosed between a backing clock 42 and a glass cloth made, of resin impregnated glass fibres 44, with an abrasion resistant coating 46 on the exterior.

A preferred composition is 60% rubber, 20% Ceepree and 20% fibre filler.

The fire protection arrangement according to FIG. 1 has been tested. For these purposes a 4 mm thick layer of the rubber/frit was employed. 75 mm thick layers of the ceramic fibres having a weight of 128 kg/m$^2$, encased in glass cloth (h) of an average weight of 576 g/m$^2$ were used. The construction was as shown in FIGS. 1 and 3. The test was on a dummy valve and actuator system at the British Gas testing facility at Spadeadam, Cumbria, following the standard procedure used in the oil industry for such purposes. In this test propane gas is fed at the rate of 3 kg per second through a 22 mm steerable nozzle to produce a long fierce erosive flame. The jacketed dummy valve and actuator are located some 10 meters from the nozzle in the core of the flame where the temperature is of the order of 1100–1200 degrees C.

After some 15 minutes the fuel flow rate is reduced to 2 kg per second for the remainder of the nest. Few passive fire protection systems last that long before they are utterly destroyed.

The system survived the test for 102 minutes, when the test was terminated. The system maintained its integrity for the duration of the test and afforded a significant degree of protection to the dummy actuator.

The degree of protection can be varied by increasing or decreasing the thickness of ceramic fibre.

I claim:

1. A fire protective composite sheet material comprising at least one layer of an insulant prone to damage by exposure to a high temperature erosive flame, and at least one non-erosive cover layer overlying said insulant having a base material of cross-linked rubber material burnable to a non-erosive protective char upon exposure to a flame, and heat-fusible ceramic frit material dispersed within said base material fusible to a hard, non-erosive shell upon exposure to such flame.

2. The sheet material of claim 1 wherein said cross-linked rubber material comprises about 40–60% of said cover layer material.

3. The sheet material of claim 2 wherein said ceramic frit comprises about 20–30% of said cover layer material.

4. The sheet material of claim 3 wherein cover layer material includes 10–40% filler.

5. The sheet material of claim 4 wherein said filler material comprises Mullite.

6. The sheet material of claim 4 wherein said filler comprises $Al_2O_3$.

7. The sheet material of claim 1 wherein said insulant layer comprises felted ceramic fibers and an enclosure containing said fibers.

8. The sheet material of claim 7 wherein said enclosure comprises a duvet.

9. The sheet material of claim 1 including means for fixing said insulant layer and said cover layer individually to an article to be protected.

10. The sheet material of claim 1 including at least one additional layer of ceramic fibers overlying said covering layer and means for fixing each of said layers individually to an article to be protected.

* * * * *